United States Patent
Salter et al.

(10) Patent No.: US 9,457,712 B2
(45) Date of Patent: Oct. 4, 2016

(54) VEHICLE SUN VISOR PROVIDING LUMINESCENT LIGHTING

(71) Applicant: Ford Global Technologies, LLC, Dearborn, MI (US)

(72) Inventors: Stuart C. Salter, White Lake, MI (US); Cornel Lewis Gardner, Romulus, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 136 days.

(21) Appl. No.: 14/579,016

(22) Filed: Dec. 22, 2014

(65) Prior Publication Data

US 2015/0138813 A1    May 21, 2015

Related U.S. Application Data

(63) Continuation-in-part of application No. 14/086,442, filed on Nov. 21, 2013.

(51) Int. Cl.
| | |
|---|---|
| *B60Q 1/00* | (2006.01) |
| *B60Q 1/26* | (2006.01) |
| *B60Q 3/02* | (2006.01) |

(52) U.S. Cl.
CPC ........... *B60Q 3/0226* (2013.01); *B60Q 3/0283* (2013.01)

(58) Field of Classification Search
CPC .. B60Q 3/008; B60Q 3/0209; B60Q 3/0226; B60Q 3/0279; B60Q 3/0283; B60Q 3/0286; B60Q 3/0296; B60Q 3/044
USPC .......................................... 362/492, 509–510
See application file for complete search history.

(56) References Cited

U.S. PATENT DOCUMENTS

| | | | |
|---|---|---|---|
| 4,947,296 | A | 8/1990 | Takeuchi et al. |
| 4,979,079 | A | 12/1990 | Tawaraya |
| 5,709,453 | A | 1/1998 | Krent et al. |
| 6,117,362 | A | 9/2000 | Yen et al. |
| 6,577,073 | B2 | 6/2003 | Shimizu et al. |
| 6,729,738 | B2 | 5/2004 | Fuwausa et al. |
| 6,737,964 | B2 | 5/2004 | Samman et al. |
| 6,773,129 | B2 | 8/2004 | Anderson, Jr. et al. |
| 6,820,888 | B1 | 11/2004 | Griffin |
| 6,851,840 | B2 | 2/2005 | Ramamurthy et al. |
| 6,859,148 | B2 | 2/2005 | Miller |
| 6,871,986 | B2 | 3/2005 | Yamanaka et al. |
| 6,953,536 | B2 | 10/2005 | Yen et al. |
| 6,990,922 | B2 | 1/2006 | Ichikawa et al. |
| 7,161,472 | B2 | 1/2007 | Strumolo et al. |
| 7,213,923 | B2 | 5/2007 | Liu et al. |
| 7,264,366 | B2 | 9/2007 | Hulse |

(Continued)

FOREIGN PATENT DOCUMENTS

| | | |
|---|---|---|
| CN | 201169230 Y | 12/2008 |
| CN | 101337492 A | 1/2009 |

(Continued)

*Primary Examiner* — Jason Moon Han
(74) *Attorney, Agent, or Firm* — Vichit Chea; Price Heneveld LLP

(57) ABSTRACT

A sun visor is provided herein. The sun visor includes a visor body and a lid coupled to the visor body. The lid is moveable between a closed and an open position. A photoluminescent structure is coupled to the lid and a light source is configured to emit light based on the position of the lid. The photoluminescent structure luminesces in response to excitation by light emitted from the light source.

20 Claims, 5 Drawing Sheets

(56) References Cited

U.S. PATENT DOCUMENTS

| | | |
|---|---|---|
| 7,264,367 B2 | 9/2007 | Hulse |
| 7,422,352 B2 | 9/2008 | Sakakibara |
| 7,441,914 B2 | 10/2008 | Palmer et al. |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,071,988 B2 | 12/2011 | Lee et al. |
| 8,097,843 B2 | 1/2012 | Agrawal et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,773,012 B2 | 7/2014 | Ryu et al. |
| 8,846,184 B2 | 9/2014 | Agrawal et al. |
| 8,952,341 B2 | 2/2015 | Kingsley et al. |
| 9,057,021 B2 | 6/2015 | Kingsley et al. |
| 9,065,447 B2 | 6/2015 | Buttolo et al. |
| 9,299,887 B2 | 3/2016 | Lowenthal et al. |
| 2002/0159741 A1 | 10/2002 | Graves et al. |
| 2002/0163792 A1 | 11/2002 | Formoso |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2007/0032319 A1 | 2/2007 | Tufte |
| 2007/0285938 A1 | 12/2007 | Palmer et al. |
| 2009/0219730 A1 | 9/2009 | Syfert et al. |
| 2009/0251920 A1 | 10/2009 | Kino et al. |
| 2009/0262515 A1 | 10/2009 | Lee et al. |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0335994 A1 | 12/2013 | Mulder et al. |
| 2014/0065442 A1 | 3/2014 | Kingsley et al. |
| 2014/0103258 A1 | 4/2014 | Agrawal et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0138789 A1 | 5/2015 | Singer et al. |
| 2015/0267881 A1 | 9/2015 | Salter et al. |
| 2016/0016506 A1 | 1/2016 | Collins et al. |

FOREIGN PATENT DOCUMENTS

| | | |
|---|---|---|
| CN | 201193011 Y | 2/2009 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| WO | 2006047306 A1 | 5/2006 |
| WO | 2014068440 A1 | 5/2014 |

VEHICLE SUN VISOR PROVIDING LUMINESCENT LIGHTING

CROSS-REFERENCE TO RELATED APPLICATION

This application is a continuation-in-part of U.S. patent application Ser. No. 14/086,442, filed Nov. 21, 2013, and entitled "VEHICLE LIGHTING SYSTEM WITH PHOTOLUMINESCENT STRUCTURE," the entire disclosure of which is hereby incorporated herein by reference.

FIELD OF THE INVENTION

The present disclosure generally relates to vehicle lighting systems, and more particularly, to vehicle lighting systems employing one or more photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present invention, a sun visor is provided. The sun visor includes a visor body and a lid coupled to the visor body. The lid is moveable between a closed and an open position. A photoluminescent structure is coupled to the lid and a light source is configured to emit light based on the position of the lid. The photoluminescent structure luminesces in response to excitation by light emitted from the light source.

According to another aspect of the present invention, a sun visor is provided. The sun visor includes a visor body and a lid hingedly coupled to the visor body and moveable between a closed and open position. A photoluminescent structure is coupled to the lid and a light source is configured to emit light based on the position of the lid. The photoluminescent structure luminesces in response to excitation by light emitted from the light source.

According to another aspect of the present invention, a sun visor is provided. The sun visor includes a visor body and a lid hingedly coupled to the visor body and moveable between a closed and an open position. A photoluminescent structure is located on an underside of the lid and is concealed when the lid is closed. A light source is configured to emit light when the lid is moved away from the closed position. The photoluminescent structure luminesces in response to excitation by light emitted from the light source.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein.

However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a vehicle lighting system that advantageously employs one or more photoluminescent structures configured to convert light received from an associated light source and re-emit the light at a different wavelength.

Figure 1A:
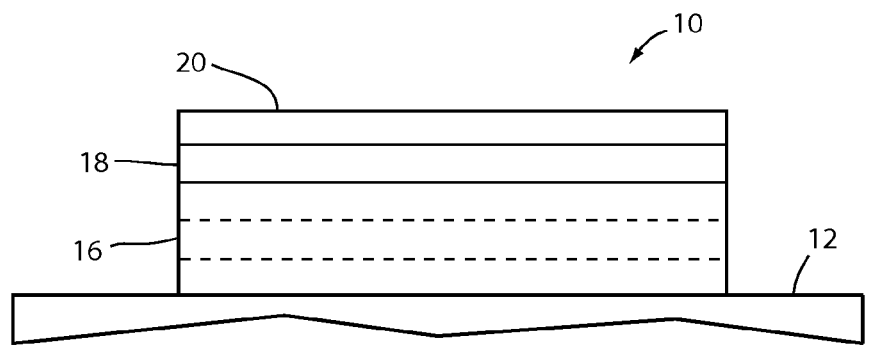
FIG. 1A illustrates a photoluminescent structure coupled to a substrate, according to one embodiment.
Figure 1B:
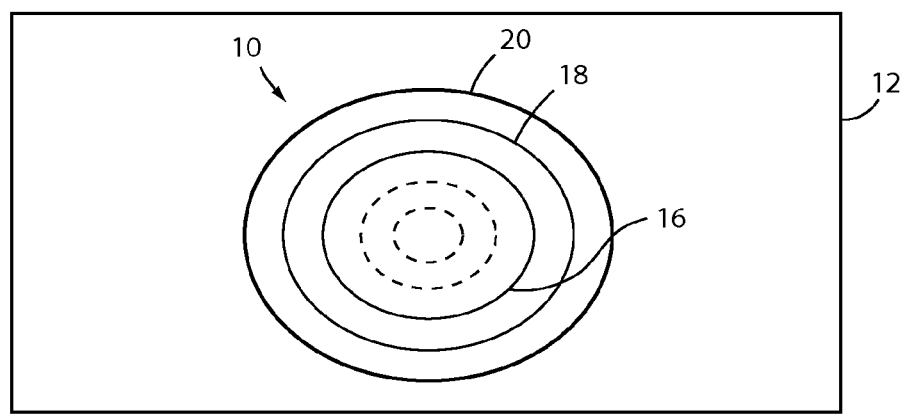
FIG. 1B illustrates a photoluminescent structure coupled to a substrate, according to another embodiment.
Figure 1C:
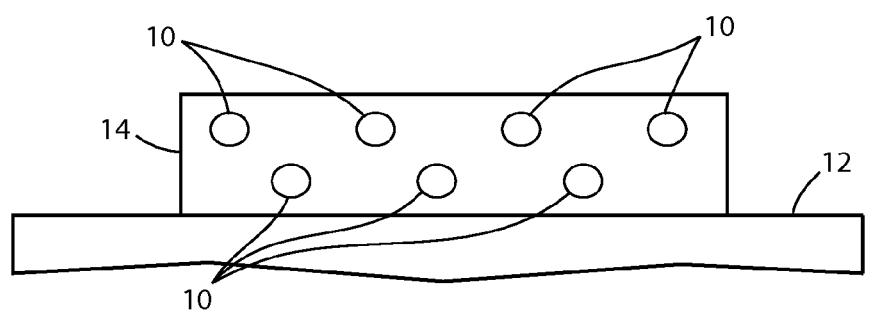
FIG. 1C illustrates a photoluminescent structure coupled to a substrate, according to yet another embodiment.

Referring to FIGS. 1A-1C, various exemplary embodiments of a photoluminescent structure 10 are shown, each capable of being coupled to a substrate 12, which may correspond to a vehicle fixture or vehicle related piece of equipment. In FIG. 1A, the photoluminescent structure 10 is generally shown rendered as a coating (e.g. a film) that may be applied to a surface of the substrate 12. In FIG. 1B, the photoluminescent structure 10 is generally shown as a discrete particle capable of being integrated with a substrate 12. In FIG. 1C, the photoluminescent structure 10 is generally shown as a plurality of discrete particles that may be incorporated into a support medium 14 (e.g. a film) that may then be applied (as shown) or integrated with the substrate 12.

At the most basic level, a given photoluminescent structure 10 includes an energy conversion layer 16 that may include one or more sub layers, which are exemplarily shown through broken lines in FIGS. 1A and 1B. Each sub layer of the energy conversion layer 16 may include one or more photoluminescent materials having energy converting elements with phosphorescent or fluorescent properties. Each photoluminescent material may become excited upon receiving light of a specific wavelength, thereby causing the light to undergo a conversion process. Under the principle of down conversion, the inputted light is converted into a longer wavelength light that is outputted from the photoluminescent structure 10. Conversely, under the principle of up conversion, the inputted light is converted into a shorter wavelength light that is outputted from the photoluminescent structure 10. When multiple distinct wavelengths of light are outputted from the photoluminescent structure 10 at the same time, the wavelengths of light may mix together and be expressed as a multicolor light.

In some embodiments, light that has been down converted or up converted may be used to excite other photoluminescent material(s) found in the energy conversion layer 16. The process of using converted light outputted from one photoluminescent material to excite another, and so on, is generally known as an energy cascade and may serve as an alternative for achieving various color expressions. With respect to either conversion principle, the difference in wavelength between the exciting light and the converted light is known as the Stokes shift and serves as the principle driving mechanism for an energy conversion process corresponding to a change in wavelength of light. In the various implementations discussed herein, each of the photoluminescent structures may operate under either conversion principle.

The energy conversion layer 16 may be prepared by dispersing the photoluminescent material in a polymer matrix to form a homogenous mixture using a variety of methods. Such methods may include preparing the energy conversion layer 16 from a formulation in a liquid carrier medium and coating the energy conversion layer 16 to a desired substrate. The energy conversion layer 16 may be applied to a substrate by painting, screen printing, spraying, slot coating, dip coating, roller coating, and bar coating. Alternatively, the energy conversion layer 16 may be prepared by methods that do not use a liquid carrier medium. For example, the energy conversion layer 16 may be rendered by dispersing the photoluminescent material into a solid state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate using any methods known to those skilled in the art. When the energy conversion layer 16 includes sub layers, each sub layer may be sequentially coated to form the energy conversion layer 16. Alternatively, the sub layers can be separately prepared and later laminated or embossed together to form the energy conversion layer 16. Alternatively still, the energy conversion layer 16 may be formed by coextruding the sub layers.

Referring back to FIGS. 1A and 1B, the photoluminescent structure 10 may optionally include at least one stability layer 18 to protect the photoluminescent material contained within the energy conversion layer 16 from photolytic and thermal degradation. The stability layer 18 may be configured as a separate layer optically coupled and adhered to the energy conversion layer 16. Alternatively, the stability layer 18 may be integrated with the energy conversion layer 16. The photoluminescent structure 10 may also optionally include a protection layer 20 optically coupled and adhered to the stability layer 18 or other layer (e.g. the conversion layer 16 in the absence of the stability layer 18) to protect the photoluminescent structure 10 from physical and chemical damage arising from environmental exposure. The stability layer 18 and/or the protective layer 20 may be combined with the energy conversion layer 16 through sequential coating or printing of each layer, sequential lamination or embossing, or any other suitable means.

Additional information regarding the construction of photoluminescent structures is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Jul. 31, 2012, the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM," filed Jun. 26, 2012; U.S. Pat. No. 8,247,761 to Agrawal et al., entitled "PHOTOLUMINESCENT MARKINGS WITH FUNCTIONAL OVERLAYERS," filed Aug. 21, 2012; U.S. Pat. No. 8,519,359 B2 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Aug. 27, 2013; U.S. Pat. No. 8,664,624 B2 to Kingsley et al., entitled "ILLUMINATION DELIVERY SYSTEM FOR GENERATING SUSTAINED SECONDARY EMISSION," filed Mar. 4, 2014; U.S. Patent Publication No. 2012/0183677 to Agrawal et al., entitled "PHOTOLUMINESCENT COMPOSITIONS, METHODS OF MANUFACTURE AND NOVEL USES," filed Jul. 19, 2012; U.S. Patent Publication No. 2014/0065442 A1 to Kingsley et al., entitled "PHOTOLUMINESCENT OBJECTS," filed Mar. 6, 2014; and U.S. Patent Publication No. 2014/0103258 A1 to Agrawal et al., entitled "CHROMIC LUMINESCENT COMPOSITIONS AND TEXTILES," filed Apr. 17, 2014, all of which are included herein by reference in their entirety.

Figure 2:
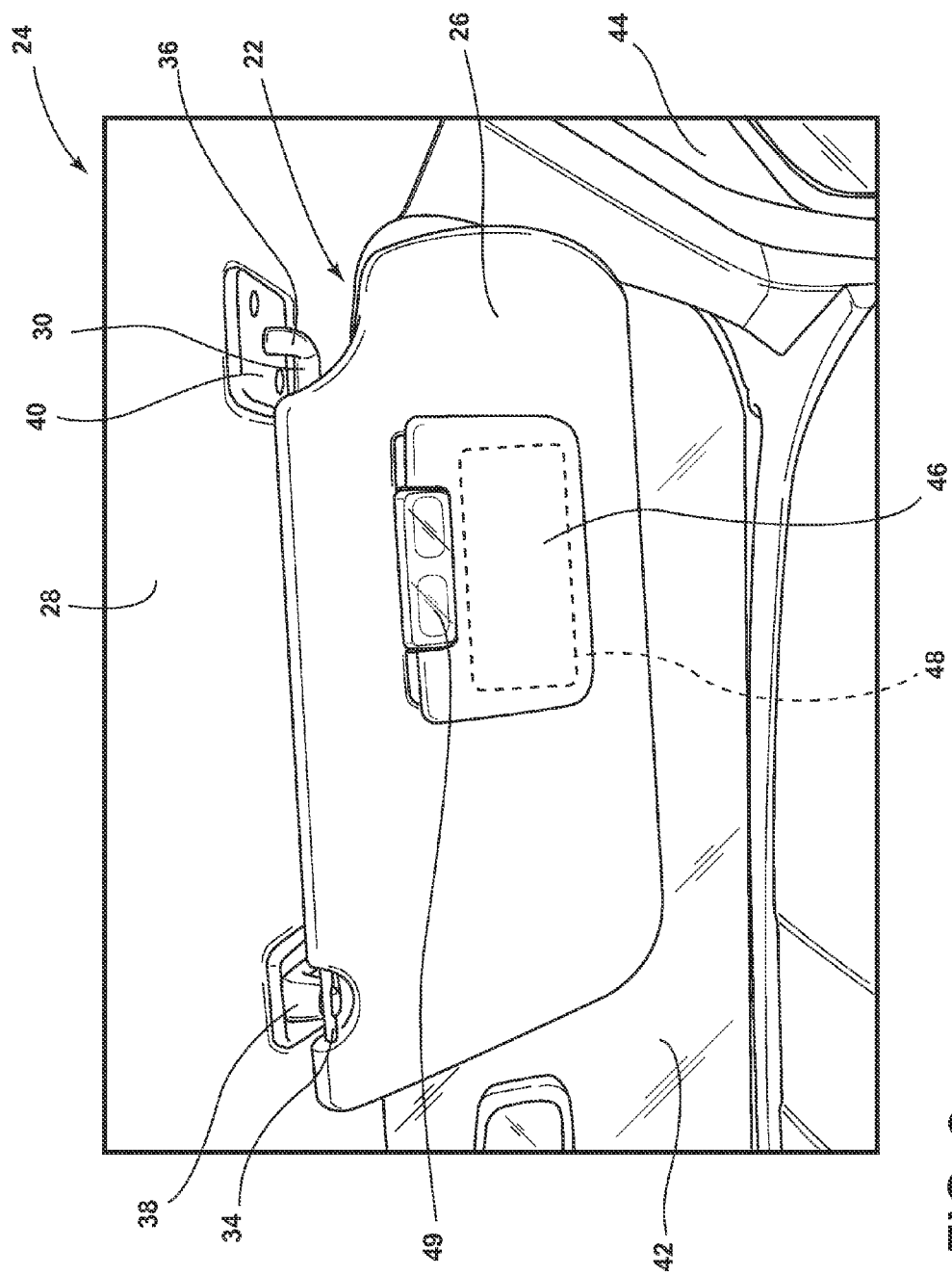
FIG. 2 illustrates a conventional sun visor according to one embodiment.

Referring to FIG. 2, a conventional sun visor 22 for use in a vehicle 24 is shown according to one embodiment. The sun visor 22 includes a visor body 26 that is coupled to a headliner 28 of the vehicle 24 via a rod 30 that is disposed horizontally within the visor body 26. The rod 30 has a portion 34 that is exposed through the visor body 26 and another portion 36 that extends beyond the visor body 26 upward toward the headliner 28. Portion 34 is clipped or otherwise removably secured to the headliner 28 through mounting bracket 38 and portion 36 is pivotally coupled to the headliner 28 through mounting bracket 40. When portion 34 is secured to mounting bracket 38, the angular position of the visor body 26 is adjustable between a stored and an in-use position. In FIG. 2, the visor body 26 is exemplarily shown in one possible in-use position adjacent a windshield 42 of the vehicle 24 to shield a vehicle occupant's eyes from sunlight and/or to allow the vehicle occupant to access features on the visor body 26. Once the use of the visor body 26 is no longer needed, the visor body 26 can be swung upward, ultimately coming to rest in the stored position adjacent the headliner 28. Alternatively, portion 34 may be detached from mounting bracket 38 to allow the visor body 26 to be turned sideways such that the visor body 26 is in another in-use position adjacent a side window 44 of the vehicle 24.

Referring still to FIG. 2, a lid 46 is hingedly coupled to the visor body 26 and is movable between a closed and an open position. In the closed position, as shown in FIG. 2, the lid 46 covers a vanity mirror 48. To access the vanity mirror 48, a vehicle occupant can move the lid 46 away from the closed position, thereby exposing the vanity mirror 48. In such an arrangement, a light source 49 may become activated when the lid 46 is moved to an open position, or said differently, when the vanity mirror 48 is uncovered. In operation, light emitted from the light source 49 is typically directed in a fixed direction and serves only to provide illumination to the area surrounding the vanity mirror 48. As a result, the sun visor 22 is disadvantaged by having limited lighting capabilities despite being highly adjustable in nature.

Figure 3:
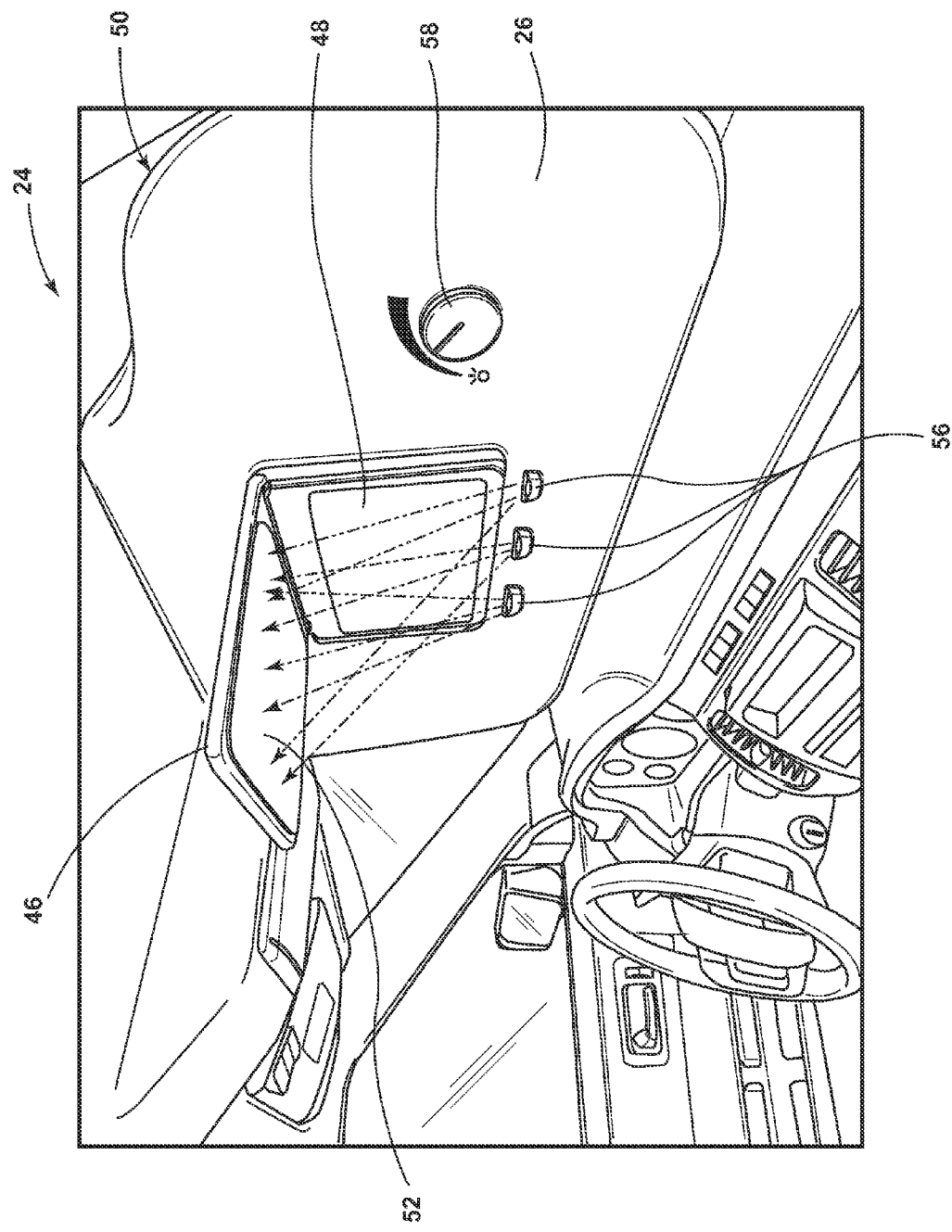
FIG. 3 illustrates a novel sun visor according to one embodiment.

Referring to FIG. 3, a novel sun visor 50 for use in a vehicle 24 is shown according to one embodiment. The sun visor 50 may be constructed similarly to sun visor 22 and includes a visor body 26 and a lid 46 that is hingedly coupled to the visor body 26 for covering a vanity mirror 48. As will be described in greater detail below, the sun visor 50 advantageously utilizes the adjustability of the visor body 26 to not only provide lighting around the vanity mirror 48, but also provide spot lighting that may be used to illuminate a variety of areas inside and outside the vehicle 24. In this way, the sun visor 50 described herein provides dynamic functionality and increased lighting capabilities that surpass the offerings of conventional sun visors and may be preferred over lighting provided by other interior lights such as dome lamps and map lamps.

For purposes of illustration, the visor body 26 is shown in an in-use position and the lid 46 is shown in an open position. A photoluminescent structure 52 is applied or otherwise coupled to the underside of the lid 46. The photoluminescent structure 52 may be substantially congruent with the underside and is generally concealed when the lid 46 is closed. The photoluminescent structure 52 is configured to luminesce in response to excitation by light emitted from a light source, exemplarily shown as a plurality of light emitting diodes (LEDs) 56. In the illustrated embodiment, light emitted from the LEDs 56 is represented by light rays. For purposes of clarity, light rays representative of the luminescence exhibited by the photoluminescent structure have been omitted.

As shown in FIG. 3, the LEDs 56 are coupled to the visor body 26 and disposed below the vanity mirror 48. The LEDs 56 are spaced horizontally across the visor body 26 and may be recessed into the visor body 26 so as to be concealed from vehicle occupants. The LEDs 56 emit light in a fixed non-horizontal direction so that a majority of the light can reach the photoluminescent structure 52. Also, light emitted from the LEDs 56 may be diffuse and of the same intensity to provide even excitation to the photoluminescent structure 52. Depending on the beam spread of the LEDs 56, the vanity mirror 48 may function as a reflector and reflect at least a portion of the light emitted from the LEDs 56 when uncovered. Light reflected from the vanity mirror 48 may be directed toward the photoluminescent structure 52 to provide additional excitation, thereby increasing the brightness of light emitted from the photoluminescent structure 52 while in a luminescent state. As an optional feature, the light intensity of the LEDs 56 may be controlled by a control mechanism 58, which may be embodied as a rotatable knob (as shown exemplarily shown), buttons, slider, and the like. In one embodiment, the lowest light intensity setting turns off the LEDs 56. By adjusting the light intensity of the LEDs 56, a user is able to dictate the degree of excitation provided to the photoluminescent structure 52, and in turn, determine the level of brightness of the photoluminescent structure 52. The LEDs 56 may be powered by the vehicle power supply using existing connection methods for routing electrical power to a sun visor having one or more light sources.

In operation, the LEDs 56 may be configured to emit light when the lid 46 is moved away from the closed position, or said differently, when the vanity mirror 48 is uncovered. If the LEDs 56 are turned OFF, a user may be required to select a different light intensity setting via the control mechanism 58 before light can be emitted from the LEDs 56. According to one embodiment, the LEDs 56 are each configured to emit blue light (~450-495 nanometers in wavelength) to benefit from the relative low cost associated with blue LEDs. Furthermore, human eyes are less sensitive to blue light, and as a result, vehicle occupants will unlikely be affected should errant blue light enter their vision. The photoluminescent structure 52 may be configured to luminesce in a single color or a mixture of colors (e.g., white light) via the process of down conversion or up conversion. If using blue LEDs, the photoluminescent structure 52 should be configured to down convert light so that the converted light is visible to vehicle occupants.

Figure 4:
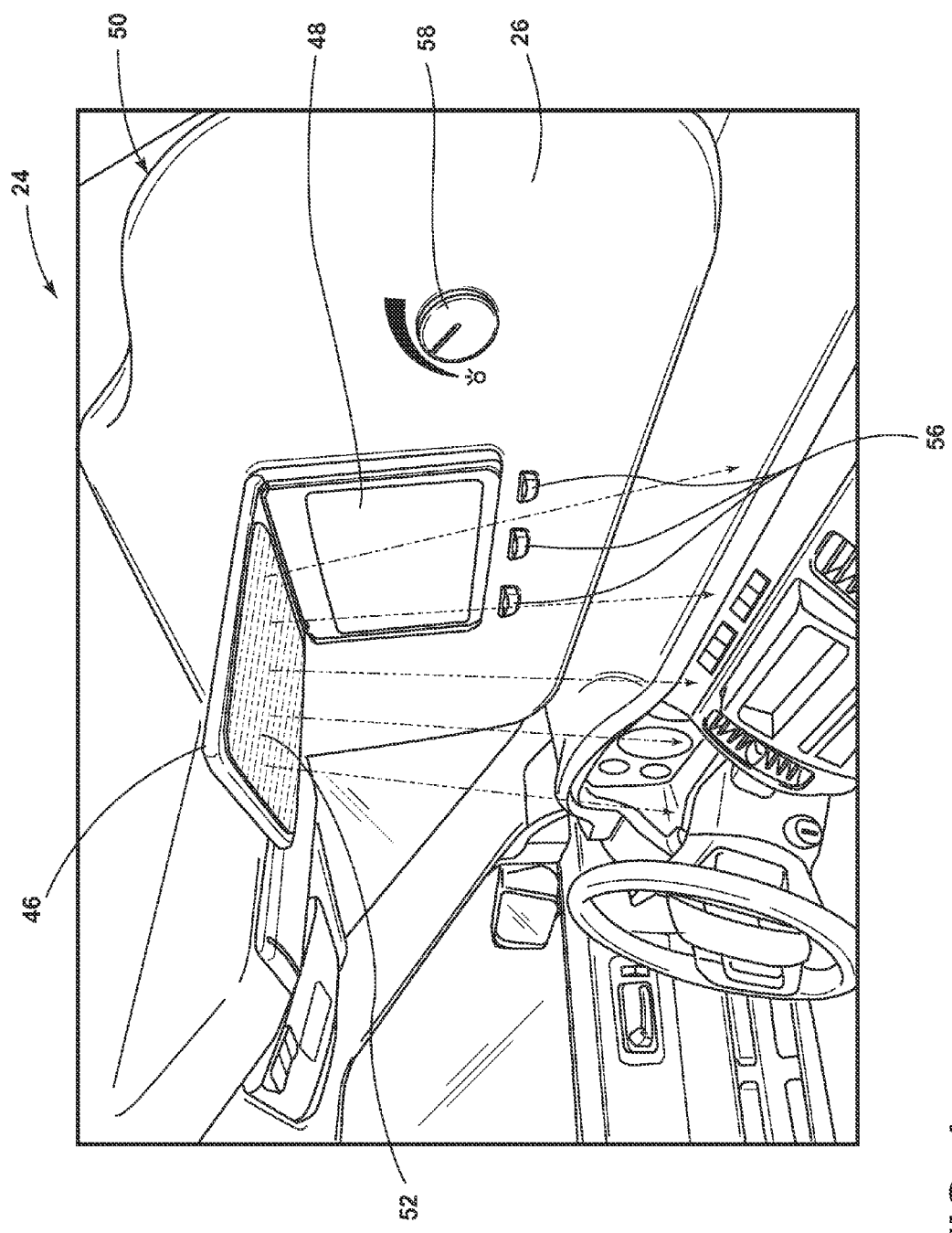
FIG. 4 illustrates a lighting scenario in which the sun visor of FIG. 3 functions as an interior vehicle light.
Figure 5:
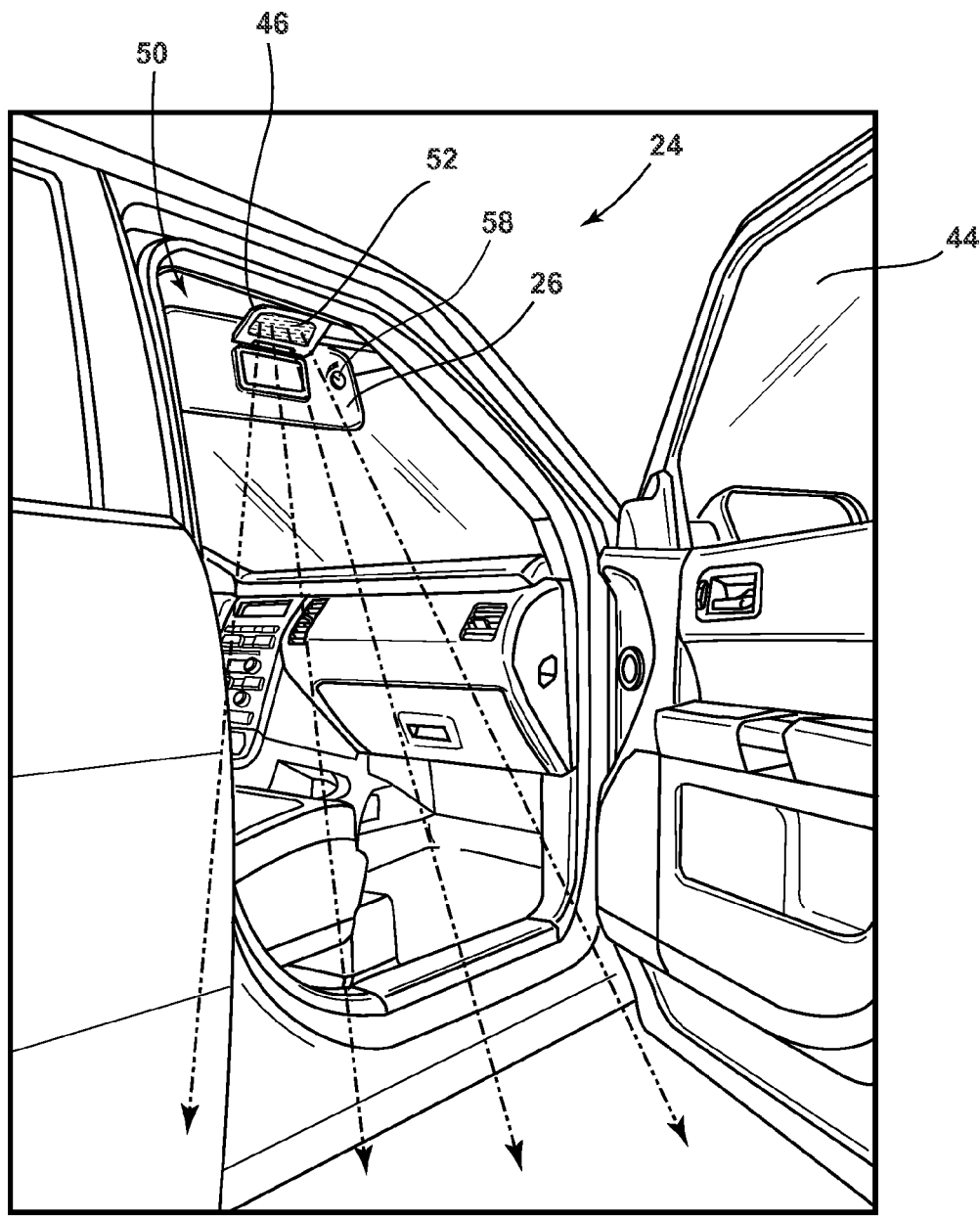
FIG. 5 illustrates a lighting scenario in which the sun visor of FIG. 3 functions as an exterior vehicle light.

While the photoluminescent structure 52 is in a state of luminescence, the resulting light emission may be aimed in a variety of directions by adjusting the position of the lid 46 and/or the visor body 26. For example, two lighting scenarios are shown in FIGS. 4 and 5 to illustrate the versatility of the sun visor 50. In each scenario, the light rays representing light emitted from the LEDs 56 have been omitted for clarity. Also, the lid 46 is configured to remain in a selected position unless a directional force is applied thereto. In this way, the lid 46 can remain in an open position without requiring a user to hold it in place. As a result, the illumination provided by the photoluminescent structure 52 is in a generally fixed direction until a user decides to move either the lid 46 or the visor body 26.

As shown in FIG. 4, the visor body 26 and the lid 46 are arranged as an interior light, whereby light emitted from the photoluminescent structure 52 is aimed in a substantially downward direction. In dark conditions, light from the photoluminescent structure 52 provides a user with sufficient illumination if using the vanity mirror 48. Additionally, light from the photoluminescent structure 52 floods the area below the sun visor 50 to provide various functional lighting. For example, light from the photoluminescent structure 52 may function as a reading light or assist a user in locating an object in the immediate vicinity or inside a container.

As shown in FIG. 5, the visor body 26 and the lid 46 are arranged as an exterior light, whereby the visor body 26 has been turned toward a side window 44 of the vehicle 24. The lid 46 is shown moved to an open position whereby light emitted from the photoluminescent structure 52 may function as a puddle lamp while also illuminating the entryway of the vehicle 24 to assist an occupant with entering or exiting the vehicle 24. This feature is particularly beneficial for occupants of taller vehicles, such as pickup trucks, sport utility vehicles, and the like. Since taller vehicles typically have entryways that are higher off the ground, the illumination provided by the photoluminescent structure 52 may help an occupant in identifying potential step hazards while entering or exiting the vehicle.

The above examples are but a few lighting possibilities that are achievable using the sun visor 50 described herein. While the sun visor 50 has been shown mounted to the passenger side of the vehicle 24, it should be appreciated that a similar sun visor 50 may also be provided on the driver side.

Accordingly, a sun visor for use in a vehicle has been advantageously shown and described herein. The sun visor is capable of providing a variety of lighting functions to the interior and the exterior of the vehicle.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A sun visor comprising:
    a visor body;
    a lid coupled to the visor body and movable between a closed and an open position;
    a photoluminescent structure coupled to the lid; and
    a light source remotely located away from the photoluminescent structure and configured to emit light based on the position of the lid, wherein the photoluminescent structure luminesces in response to excitation by light emitted from the light source.

2. The sun visor of claim 1, wherein the lid is hingedly coupled to the visor body.

3. The sun visor of claim 1, wherein the photoluminescent structure is located on an underside of the lid and is concealed when the lid is in the closed position.

4. The sun visor of claim 1, wherein the light source emits light when the lid is closed.

5. The sun visor of claim 4, wherein the lid covers a vanity mirror when in the closed position.

6. The sun visor of claim 5, wherein the vanity mirror is configured to reflect at least a portion of the light emitted from the light source when uncovered.

7. The sun visor of claim 1, wherein the light source comprises a plurality of blue light emitting diodes.

8. The sun visor of claim 1, further comprising a control mechanism for controlling the intensity of the light emitted from the light source.

9. A sun visor comprising:
    a visor body;
    a lid hingedly coupled to the visor body and movable between a closed and an open position;
    a photoluminescent structure coupled to the lid;
    a light source remotely located away from the photoluminescent structure and configured to emit light based on the position of the lid, wherein the photoluminescent structure luminesces in response to excitation by light emitted from the light source.

10. The sun visor of claim 9, wherein the photoluminescent structure is located on an underside of the lid and is concealed when the lid is closed.

11. The sun visor of claim 9, wherein the light source emits light when the lid is moved away from the closed position.

12. The sun visor of claim 11, wherein the lid covers a vanity mirror when in the closed position.

13. The sun visor of claim 12, wherein the light source is disposed on the visor body such that the vanity mirror redirects at least a portion of the light emitted from the light source when uncovered.

14. The sun visor of claim 9, wherein the light source comprises a plurality of blue light emitting diodes.

15. The sun visor of claim 9, further comprising a control mechanism for controlling the intensity of the light emitted from the light source.

16. A sun visor comprising:
    a visor body;
    a lid hingedly coupled to the visor body and movable between a closed and an open position;
    a photoluminescent structure located on an underside of the lid and concealed when the lid is closed;
    a light source remotely located away from the photoluminescent structure and configured to emit light when the lid is moved away from the closed position, wherein the photoluminescent structure luminesces in response to excitation by light emitted from the light source.

17. The sun visor of claim 16, wherein the lid covers a vanity mirror when in the closed position.

18. The sun visor of claim 17, wherein the vanity mirror is configured to reflect at least a portion of the light emitted from the light source when uncovered.

19. The sun visor of claim 16, wherein the light source comprises a plurality of blue light emitting diodes.

20. The sun visor of claim 16, further comprising a control mechanism for controlling the intensity of the light emitted from the light source.

* * * * *